United States Patent [19]

Houng

[11] Patent Number: 4,542,803

[45] Date of Patent: Sep. 24, 1985

[54] DETACHABLE INFLIGHT HEADSET FOR CIVIL AIRCRAFT

[76] Inventor: Huang C. Houng, No. 138, Chung-Hsing St., Kaohsiung City, Taiwan

[21] Appl. No.: 615,722

[22] Filed: May 31, 1984

[51] Int. Cl.[4] .............................................. H04M 1/05

[52] U.S. Cl. ................................ 181/129; 179/156 R; 179/182 A

[58] Field of Search ............................... 181/129, 137; 179/156 R, 156 A, 150, 151, 182 R, 182 A; 2/6, 91, 423

[56] References Cited

U.S. PATENT DOCUMENTS 3,447,160 6/1969 Teder .............................. 179/156 R
3,908,200 9/1975 Lundin ........................ 179/182 R X
4,189,788 2/1980 Schenke et al. ................ 179/156 R
4,472,607 9/1984 Houng ............................ 179/156 R

*Primary Examiner*—Benjamin R. Fuller
*Attorney, Agent, or Firm*—Bacon & Thomas

[57] ABSTRACT

The present invention relates to a detachable inflight headset for civil aircraft, and in particular to one comprising a pair of earpieces each including a casing provided at the side portion with a recess which comes with two slits provided within the recess and separated by a V-shaped member, a pair of covering plates each embedded on one of the casings, a pair of ear cushions each mounted on one of the covering plates, a headband each end of which is slidably engaged with one of the casings, and a pair of acoustic pipes each connected to one of the casings.

1 Claim, 6 Drawing Figures

DETACHABLE INFLIGHT HEADSET FOR CIVIL AIRCRAFT

BACKGROUND OF THE INVENTION

As a result of rapid population growth, more and more people are engaging in travelling as a leisure activity to relieve day to day stress. Accordingly, the need has arisen for an inflight headset for civil aircraft. However, the known inflight headset cannot be readily adjusted and assembled.

It is, therefore, an object of the present invention to provide an inflight headset which may obviate the above-mentioned drawbacks.

SUMMARY OF THE INVENTION

A primary object of the present invention is the provision of an inflight headset which is detachable.

Another object of the present invention is the provision of an inflight headset which may be readily adjusted in length.

Still another object of the present invention is the provision of an inflight headset which is simple in construction.

A particular object of the present invention is the provision of an inflight headset which is easy to assemble.

A further of the present invention is the provision of an inflight headset which is economical to produce.

Other objects and merits and a fuller understanding of the present invention will be obtained by those having ordinary skill in the art when the following detailed description of the best mode contemplated for practicing the invention has been read in conjunction with the accompanying drawings wherein like numerals refer to like or similar parts and in which:

DETAILED DESCRIPTION OF THE PREFERRED EMBODIMENT

Before explaining the present invention in detail, it is to be understood that the invention is not limited in its application to the details of construction and arrangement of parts illustrated in the accompaning drawings, since the invention is capable of other embodiments and of being practiced or carried out in various ways. Also, it is to be understood that the phraseology or terminology employed herein is for the purpose of description and not of limitation.

Figure 1:
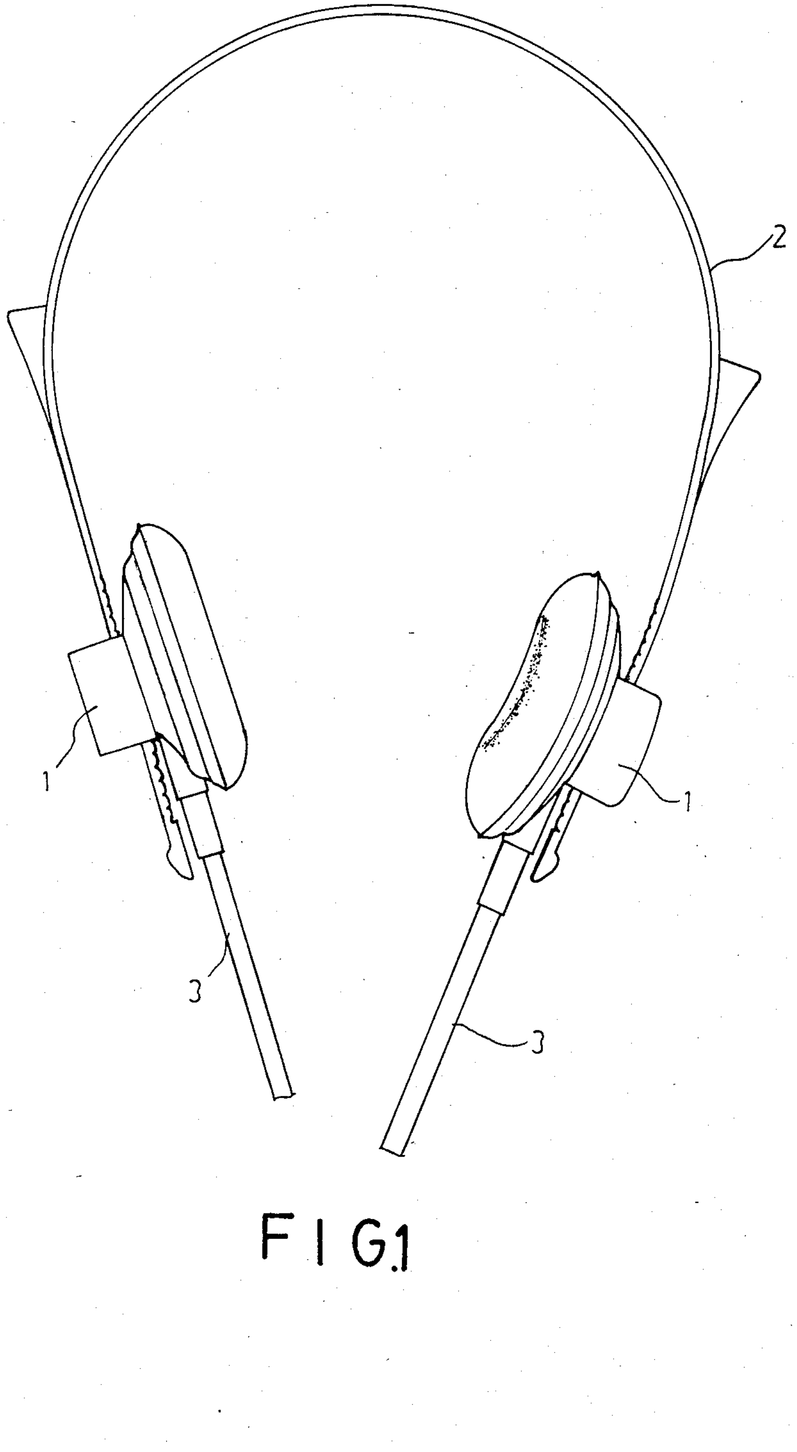
FIG. 1 is a perspective view of a detachable inflight headset for civil aircraft according to the present invention.

Referring now to the drawings and in particular to FIG. 1 thereof, the detachable inflight headset according to the present invention comprises a headband (2), a pair of earpieces (1) connected together by the headband (2), and a pair of acoustic pipes (3) each slidably engaged with one of the two earpieces (1).

Figure 5:
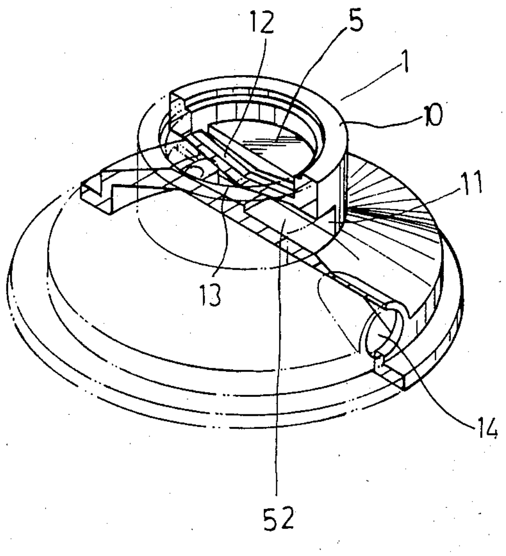
FIG. 5 is a cutaway view of an earpiece of the headset.
Figure 6:
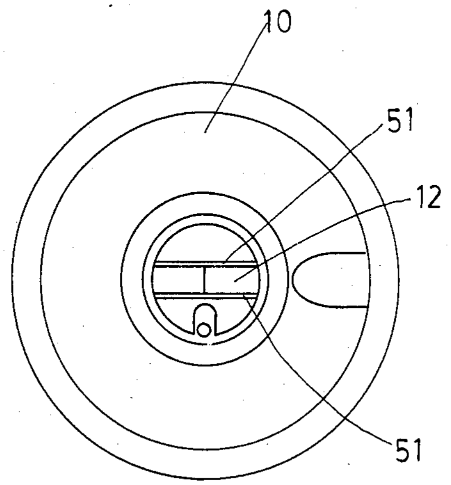
FIG. 6 is a top view of the earpiece shown in FIG. 5.

With reference to FIGS. 5 and 6 the earpiece (1) comprises a casing (10) which has a recess (5) on one side and an opening (11) under the recess (5). The casing (10) is preferably made of plastic material. The recess (5) is provided at the bottom with two slits (51) communicating with the opening (11) and separated by a V-shaped member (12). The V-shaped member (12) is integral with the casing (10) at its two ends so that it may be slightly pushed upward. A sidewall of the opening (11), which is opposite to the V-shaped member (12), has two successive stepped surfaces (13) and (52); the former is made inclined to narrow the opening (11) while the latter is made vertical. The casing (10) is further provided with a cylindrical hole (14) communicating with the interior thereof.

Figure 2:
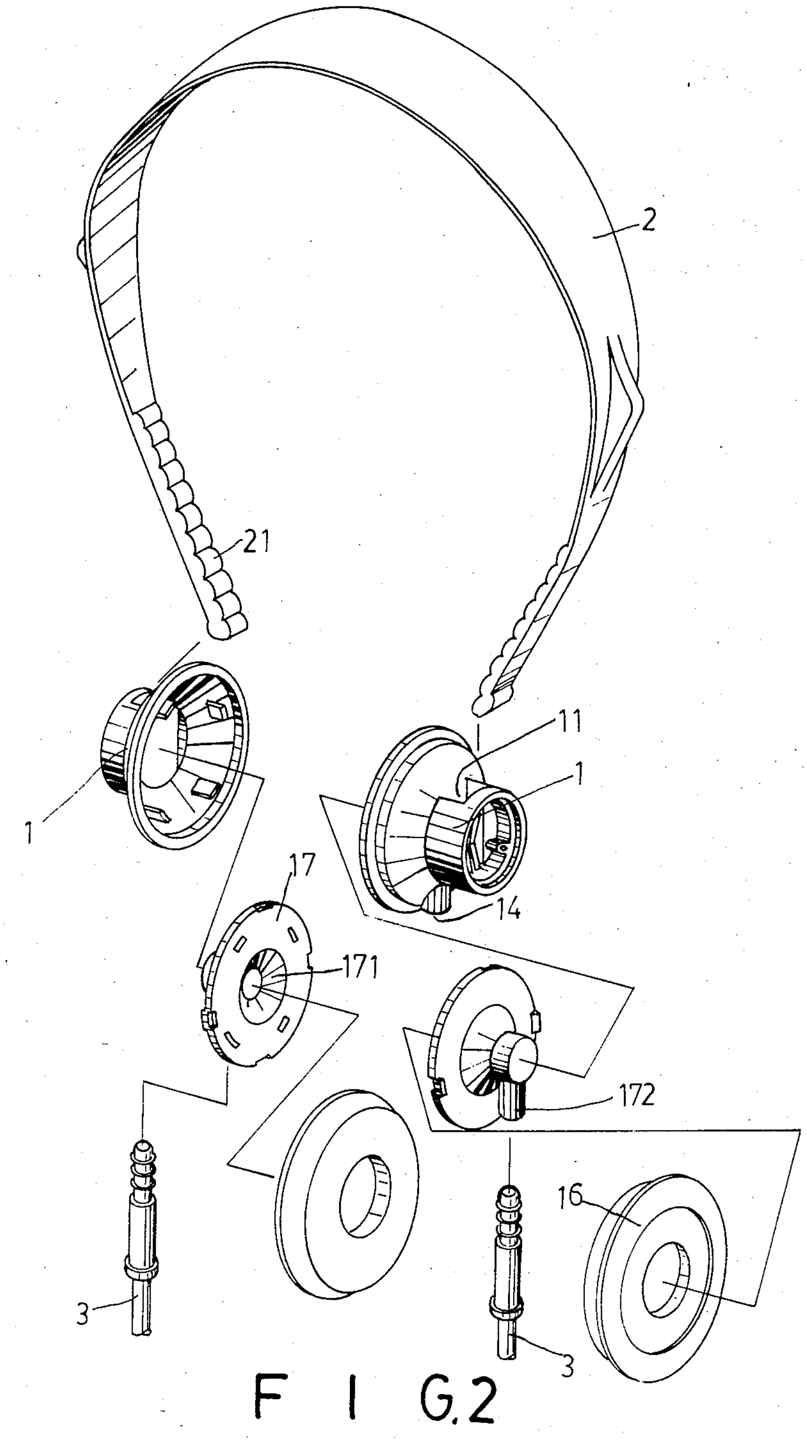
FIG. 2 is an exploded view of the headset.
Figure 3:
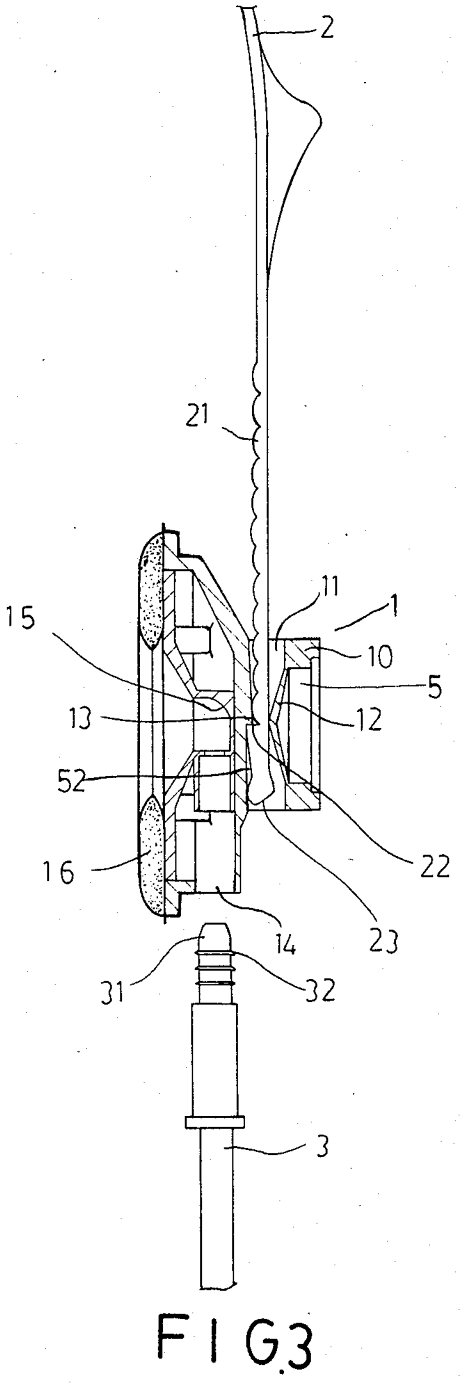
FIG. 3 is a fragmentary sectional view of the headset.
Figure 4:
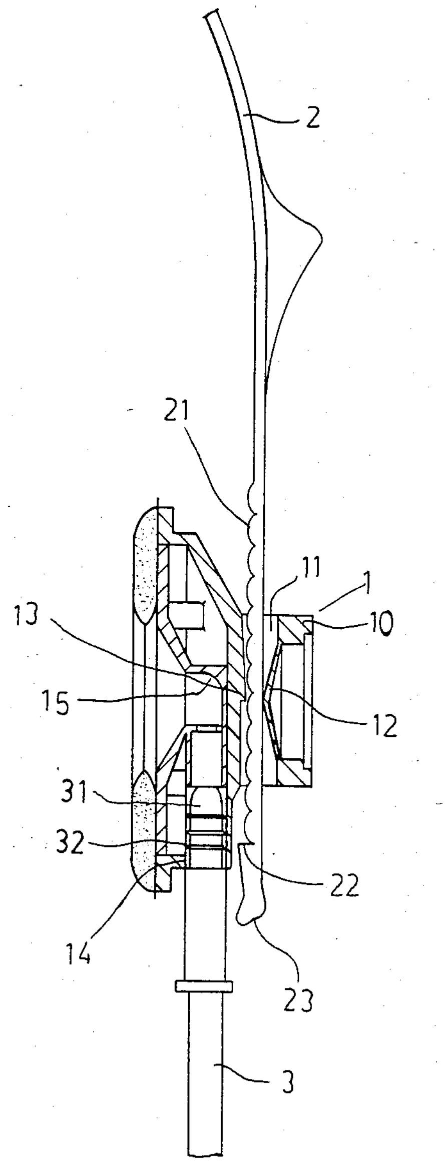
FIG. 4 is a fragmentary sectional view similar to FIG. 3, showing the connection between the earpiece and the acoustic pipe.

As seen in FIGS. 2, 3 and 4, a covering plate (17) having a central recess (171) and a tubular portion (172) communicating with the central recess (171) is embedded in the casing (10), with the tubular portion (172) aligned with the circular hole (14) of the casing (10). The circular hole (14) comes with a smoothly curved surface (15) thereby enabling the music to be faithfully transmitted. The headband (2) is provided at the inner side with a plurality of protuberances (21) which are terminated at a vertical edge (22), and provided at each end with a cant (23). The acoustic pipe (3) has a head (31) provided thereon with a number of circumferential projections (32). The head (31) of the acoustic pipe (3) is also made of plastic material so that it may be slightly deformed. As the head (31) of the acoustic pipe is inserted into the hole (14) of the casing (10), the circumferential projections (32) will be slightly deformed thereby retaining the head (31) into the hole (14). Further, an ear cushion (16) is mounted on the top of each covering plate (17).

To connect the headband (2) with the earpieces (1), each end of the headband (2) is simply pushed through the opening (11) of the casing (10) of each earpiece (1). While the end of the headband (2) is inserted into the opening (11), the cant (23) at the end of the headband (2) will force the V-shaped member (12) to move to the right with respect to FIG. 4. As the end of the headband (2) is further inserted into the opening (11), the V-shaped member (12) tends to recover so that the headband (2) may be kept into the opening (11).

Further, since the vertical edge (22) of the cant (23) of headband (2) will be engaged by step (13) of the opening (11), as the headband (2) is drawn outward, the headband (2) shall be retained with the earpieces (1).

The present ivention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and the range of equivalency of the claims are therefore intended to be embraced therein.

I claim:

1. A detachable inflight headset for civil aircraft, comprising:

(a) a pair of earpieces, each earpiece including a casing provided at one side portion with a recess partly defined by two slits separated by a V-shaped member, said V-shaped member being integral at opposed ends thereof with said casing;

(b) an opening located adjacent said recess and communicating therewith through said two slits, said opening having a side wall opposite to said V-shaped member, said side wall having two successive stepped portions, one of which is inclined to narrow said opening;

(c) a circular hole is formed with the interior of said casing;

(d) a pair of covering plates, each plate being embedded on each casing, each covering plate having a central recess and a tubular portion communicating with said central recess, said tubular portion having a smoothly curved surface;

(e) a pair of ear cushions, each cushion mounted on each covering plate;

(f) a headband having two ends, each end of which is inserted into the opening of each casing, said headband being provided at an inner side of each end with a plurality of protuberances terminating in a vertical edge and a cant at the outermost end; and (g) a pair of acoustic pipes, each pipe connected to the circular hole of each said casing and provided with a head having thereon a number of circumferential projections for engaging said circular hole.

* * * * *